(12) United States Patent
Gutman et al.

(10) Patent No.: US 11,778,558 B2
(45) Date of Patent: Oct. 3, 2023

(54) TECHNIQUES FOR PRE-OPENING NOTCH FILTER IN WIRELESS COMMUNICATIONS SYSTEM

(71) Applicant: QUALCOMM Incorporated, San Diego, CA (US)

(72) Inventors: Igor Gutman, Ramat Gan (IL); Christian Pietsch, Nuremberg (DE); Oren Matsrafi, Karkur (IL); Ronen Greenberger, Modiin (IL); Yossi Waldman, Olesh (IL); Jong Hyeon Park, San Jose, CA (US); Yuval Neeman, Mazkeret Bayta (IL); Peter Zillmann, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 17/308,524

(22) Filed: May 5, 2021

(65) Prior Publication Data
US 2022/0361101 A1    Nov. 10, 2022

(51) Int. Cl.
*H04W 52/02* (2009.01)
*H04W 72/23* (2023.01)
*H04W 72/541* (2023.01)

(52) U.S. Cl.
CPC ... *H04W 52/0229* (2013.01); *H04W 52/0258* (2013.01); *H04W 52/0274* (2013.01); *H04W 72/23* (2023.01); *H04W 72/541* (2023.01)

(58) Field of Classification Search
CPC ......... H04W 52/0229; H04W 52/0258; H04W 52/0274; H04W 72/042; H04W 72/082; H04W 72/1273; H04W 72/14; H04B 1/1036; Y02D 30/70
See application file for complete search history.

(56) References Cited

U.S. PATENT DOCUMENTS

| | | | |
|---|---|---|---|
| 10,720,947 B1 * | 7/2020 | Regadamilli | H04B 1/1027 |
| 2015/0035701 A1 * | 2/2015 | Zhang | H04B 1/71 342/357.59 |
| 2015/0049651 A1 * | 2/2015 | Hariharan | H04B 1/1036 370/278 |
| 2015/0295566 A1 * | 10/2015 | Ficici | H04B 1/0475 327/551 |
| 2021/0314017 A1 * | 10/2021 | Yang | H04B 17/13 |

* cited by examiner

*Primary Examiner* — Pao Sinkantarakorn
*Assistant Examiner* — Kabir U Jahangir
(74) *Attorney, Agent, or Firm* — Dalei Dong; Holland & Hart LLP

(57) ABSTRACT

Methods, systems, and devices for wireless communications are described. A user equipment (UE) may receive, from a base station, one or more downlink grants scheduling one or more corresponding downlink transmissions from the base station to the UE. In some examples, the UE may enter a state of sleep prior to receiving the one or more downlink transmissions. In such examples, the UE may wake up from the state of sleep at a first time that is at least a threshold period of time before a second time corresponding to a beginning of the one or more downlink transmissions. After waking up from the state of sleep, the UE may activate a notch filter and use the activated notch filter to filter a spur generated at the UE. The UE may receive the one or more downlink transmissions with improved reliability based on activating the notch filter.

30 Claims, 12 Drawing Sheets

Downlink Transmissions 225

TECHNIQUES FOR PRE-OPENING NOTCH FILTER IN WIRELESS COMMUNICATIONS SYSTEM

FIELD OF DISCLOSURE

The present disclosure relates to wireless communications, including techniques for pre-opening notch filter in wireless communications system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE may generate internal signals while performing wireless communications with a base station. These internal signals, otherwise known as spurs, may interfere with the wireless communications between the UE and the base station.

SUMMARY

The present disclosure relates to improved methods, systems, devices, and apparatuses that support techniques for pre-opening notch filter in wireless communications system. The present disclosure provides for efficiently mitigating spurs after waking from a state of sleep. As an example, a user equipment (UE) may be scheduled to begin receiving a downlink transmission from a base station at a first time. The UE may be configured enter a state of sleep to reduce power consumption. To reduce a likelihood of spurs interfering with the reception of the downlink transmissions, the UE may wake from the state of sleep a threshold time period before the first time such that the UE may calibrate a notch filter before the base station begins transmitting the downlink transmission. The UE may use the calibrated notch filter to mitigate interference from spurs, thereby enabling the UE to receive the downlink transmission from the base station with improved reliability.

In some examples, the UE may calibrate the notch filter based on tracking one or more characteristics of a spur. For example, the UE may track one or more of an amplitude, a frequency, or a phase associated with the spur. Additionally or alternatively, the UE may calibrate the notch filter based on configuring the notch filter with multiple filtering coefficients. In some examples, the UE may determine whether the notch filter is effectively filtering the spur based on performing one or more interference measurements of the spur. For example, the UE may determine that the notch filter has attained a threshold accuracy with respect to the spur based on the one or more interference measurements. In some examples, if the notch filter has not attained the threshold accuracy before the first time at which the UE is scheduled to begin receiving the downlink transmission from the base station, the UE may continue to calibrate the notch filter after the first time.

A method for wireless communication at a UE is described. The method may include receiving one or more downlink grants, activating a notch filter at a first time, where the first time is at least a threshold period of time prior to a beginning of a first downlink grant of the one or more downlink grants, filtering interference from a signal at the UE using the activated notch filter, and communicating with a base station in accordance with the one or more downlink grants and based on filtering the interference.

An apparatus for wireless communication at a UE is described. The apparatus may include a processor, memory coupled with the processor, and instructions stored in the memory. The instructions may be executable by the processor to cause the apparatus to receive one or more downlink grants, activate a notch filter at a first time, where the first time is at least a threshold period of time prior to a beginning of a first downlink grant of the one or more downlink grants, filter interference from a signal at the UE using the activated notch filter, and communicate with a base station in accordance with the one or more downlink grants and based on filtering the interference.

Another apparatus for wireless communication at a UE is described. The apparatus may include means for receiving one or more downlink grants, means for activating a notch filter at a first time, where the first time is at least a threshold period of time prior to a beginning of a first downlink grant of the one or more downlink grants, means for filtering interference from a signal at the UE using the activated notch filter, and means for communicating with a base station in accordance with the one or more downlink grants and based on filtering the interference.

A non-transitory computer-readable medium storing code for wireless communication at a UE is described. The code may include instructions executable by a processor to receive one or more downlink grants, activate a notch filter at a first time, where the first time is at least a threshold period of time prior to a beginning of a first downlink grant of the one or more downlink grants, filter interference from a signal at the UE using the activated notch filter, and communicate with a base station in accordance with the one or more downlink grants and based on filtering the interference.

Some examples of the method, apparatuses, and non-transitory computer-readable medium described herein may further include operations, features, means, or instructions for waking up from a state of sleep at the first time, where activating the notch filter may be based on waking up from the state of sleep.

Some examples of the method, apparatuses, and non-transitory computer-readable medium described herein may further include operations, features, means, or instructions for measuring the interference after waking up from the state of sleep and activating the notch filter and identifying, based on measuring the interference, at least one of an amplitude of the interference, a frequency of the interference, or a phase of the interference, where filtering the interference at the UE may be based on the amplitude of the interference, the frequency of the interference, or the phase of the interference.

Some examples of the method, apparatuses, and non-transitory computer-readable medium described herein may further include operations, features, means, or instructions for activating one or more analog phase locked loops based on waking up from the state of sleep and identifying the phase associated with the interference based on activating the one or more analog phase locked loops, where the one or more analog phase locked loops of the UE remain deactivated while the UE is in the state of sleep.

Some examples of the method, apparatuses, and non-transitory computer-readable medium described herein may further include operations, features, means, or instructions for determining a second time associated with the beginning of the first downlink grant, where the second time may be later than the first time and a difference between the first time and the second time may be greater than or equal to the threshold period of time. In some examples of the method, apparatuses, and non-transitory computer-readable medium described herein, filtering the interference may include operations, features, means, or instructions for filtering the interference after the second time associated with the beginning of the first downlink grant of the one or more downlink grants.

Some examples of the method, apparatuses, and non-transitory computer-readable medium described herein may further include operations, features, means, or instructions for configuring the notch filter with multiple filtering coefficients at the first time, where filtering the interference further includes filtering the interference using the configured notch filter.

Some examples of the method, apparatuses, and non-transitory computer-readable medium described herein may further include operations, features, means, or instructions for performing one or more measurements of the interference based on configuring the notch filter and determining that the configured notch filter satisfies an accuracy threshold based on the one or more measurements. In some examples of the method, apparatuses, and non-transitory computer-readable medium described herein, the notch filter may satisfy the accuracy threshold prior to second time associated with the beginning of the first downlink grant of the one or more downlink grants.

Some examples of the method, apparatuses, and non-transitory computer-readable medium described herein may further include operations, features, means, or instructions for performing a set of channel measurements, where activating the notch filter includes activating the notch filter at the first time is based on determining that the set of channel measurements satisfies a threshold. In some examples of the method, apparatuses, and non-transitory computer-readable medium described herein, a convergence of the notch filter to the interference occurs prior to the beginning of the one or more downlink grants. In some examples of the method, apparatuses, and non-transitory computer-readable medium described herein, the interference includes a spur generated at the UE.

Some examples of the method, apparatuses, and non-transitory computer-readable medium described herein may further include operations, features, means, or instructions for activating the notch filter at the first time may be based on a low noise amplifier state change, an analog front end state change, an analog digital converter state change, a phase locked loop reconfiguration, or a combination thereof.

DETAILED DESCRIPTION

Figure 1:
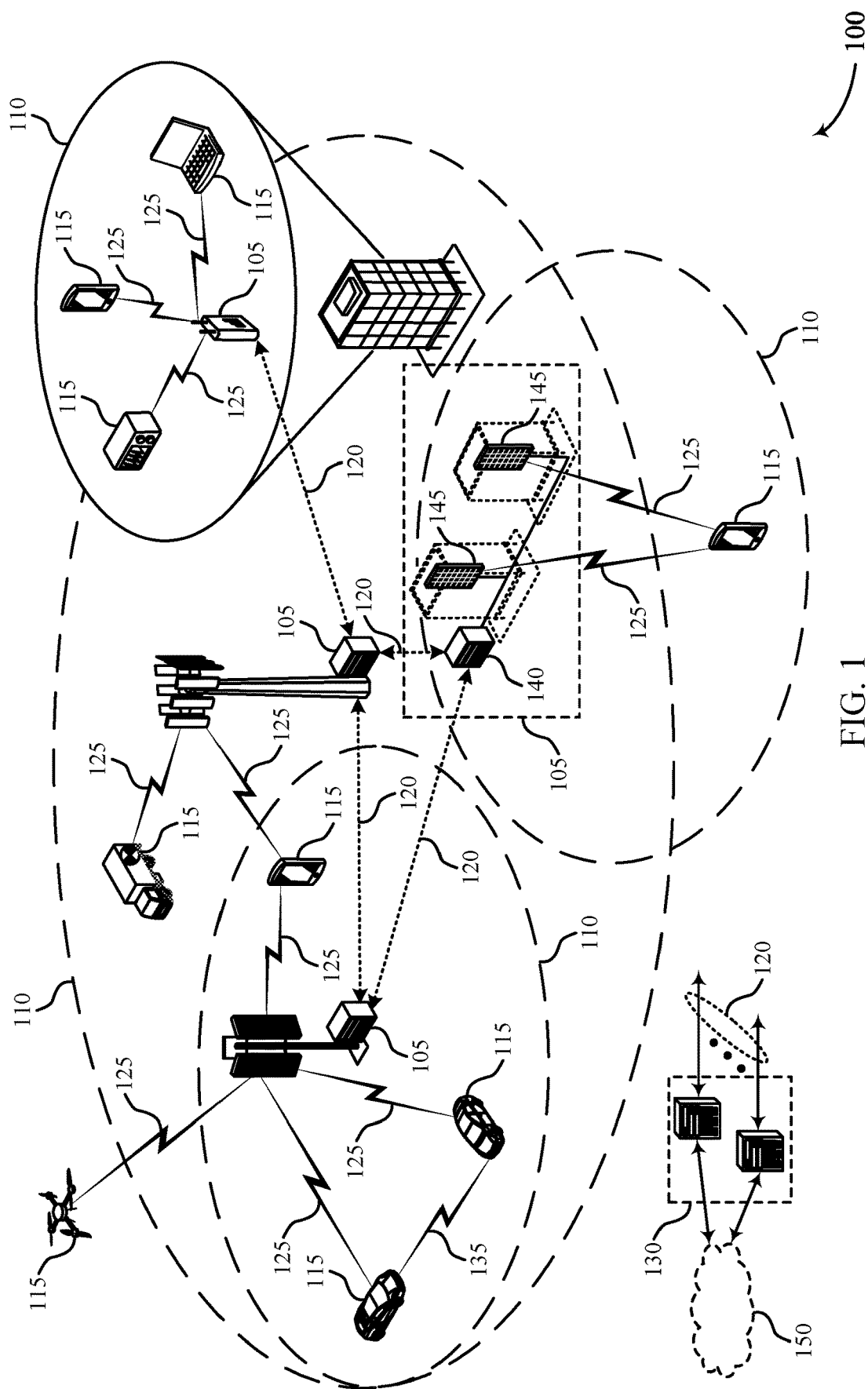
FIG. 1 illustrates an example of a wireless communications system that supports techniques for pre-opening notch filter in wireless communications system in accordance with various aspects of the present disclosure.

In some wireless communications systems, a user equipment (UE) may generate internal signals, also known as spurs, while communicating with a base station. These spurs may reduce the reliability of communications between the UE and the base station. For example, spurs generated at the UE may reduce a likelihood of the UE successfully receiving a downlink transmission from the base station. In some cases, the UE may employ a notch filter to reduce interference from spurs. More specifically, the UE may track characteristics of a spur and may use the tracked characteristics to calibrate the notch filter. For example, the UE may track one or more of an amplitude, a frequency, or a phase associated with the spur and may configure the notch filter to filter out (e.g., suppress) signals with the tracked amplitude, frequency, or phase associated with the spur. As a result, the notch filter may reduce interference from the spur.

The UE may be configured enter a state of sleep to reduce power consumption. While in the state of sleep, the UE may be unable to track characteristics of the spur. For example, the UE may use one or more analog phase locked loops (PLLs) to track characteristics of the spur, and may deactivate the analog PLLs when in the state of sleep (e.g., to reduce power consumption). As a result, the notch filter may not be calibrated when the UE wakes up from the state of sleep. Thus, the spur may cause interference if the UE attempts to perform communications with a base station after waking from the state of sleep.

In accordance with various aspects of the present disclosure, if the UE is in a state of sleep and is scheduled to begin receiving a downlink transmission from the base station at a first time, the UE may reduce the likelihood of a spur interfering with the downlink transmission by waking up from the state of sleep (e.g., deep sleep) before the first time such that the UE may activate (e.g., open) and calibrate a notch filter before receiving the downlink transmission. Waking up from the state of sleep prior to the downlink transmission may enable the UE to calibrate the notch filter with improved efficiency and higher accuracy (e.g., in comparison to calibrating the notch filter while attempting to receive the downlink transmission).

In some examples, the UE may determine whether the notch filter has converged on the spur based on performing one or more interference measurements of the spur. That is, the UE may determine whether the notch filter is effectively suppressing the spur based on the one or more interference measurements. Activating the notch filter prior to the downlink transmission may enable the notch filter to converge on the spur in a short time duration. In contrast, opening the notch filter in conjunction with reception of the downlink transmission may result in a relatively longer convergence time. In some examples, the UE may further decrease the time between when the UE activates the notch filter and when the notch filter converges on the spur based on configuring the notch filter with multiple filtering coefficients (e.g., K values). This technique may provide improved convergence speed and reduced signal distortion, among other benefits.

In some examples, the UE may calibrate the notch filter more efficiently while operating in a millimeter wave (mmW) radio frequency spectrum band because the mmW radio frequency spectrum band may be associated with a thermally limited link budget. That is, the mmW radio frequency spectrum band may be associated with relatively low noise levels. As a result, the notch filter may converge on the spur rather than converging on a combination of the spur and external noise. Thus, operating in a mmW radio frequency spectrum band (or any radio frequency spectrum band with low noise levels) may enable the UE to calibrate the notch filter with enhanced precision, among other benefits.

Aspects of the present disclosure may be implemented to realize one or more of the following advantages. The present disclosure may support improved spur suppression at a UE after the UE wakes up from a period of sleep. For example, the present disclosure may enable a UE to wake up from a state of sleep and open a notch filter prior to receiving transmissions from a base station. Opening the notch filter receiving transmissions from the base station may enable the UE to calibrate the notch filter with greater precision and a higher convergence speed, among other benefits. As a result, the UE may communicate with the base station with improved reliability based on using the calibrated notch filter to reduce interference from spurs generated at the UE.

Aspects of the disclosure are initially described in the context of wireless communications systems. Aspects of the disclosure are further illustrated by and described with reference to transmission schedules, process flows, apparatus diagrams, system diagrams, and flowcharts that relate to techniques for pre-opening notch filter in wireless communications system.

FIG. 1 illustrates an example of a wireless communications system 100 that supports techniques for pre-opening notch filter in wireless communications system in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a specific bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a specific radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a specific carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or fifth generation core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more frequency bands in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming.

The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at specific orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a specific orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a specific receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a UE 115 may generate undesired internal signals while performing wireless communications with a base station 105. These undesired internal signals, otherwise known as spurs, may interfere with the wireless communications between the UE 115 and the base station 105. In some cases, the UE 115 may use a notch filter to mitigate interference caused by a spur. For example, the UE 115 may track characteristics of the spur and may calibrate the notch filter based on these characteristics. The calibrated notch filter may reduce interference caused by the spur. In some cases, however, the UE 115 may enter a state of sleep (or may perform one or more state changes) and may be unable to track the characteristics of the spur. As a result, the notch filter may not be calibrated when the UE 115 exits the state of sleep.

In accordance with various aspects of the present disclosure, a UE 115 may be configured to pre-open a notch filter prior to receiving one or more downlink transmissions. A UE 115, in a state of sleep may be scheduled to begin receiving a downlink transmission from a base station 105 at a first time. According to aspects depicted herein, the UE 115 may reduce a likelihood of a spur generated at the UE 115 by waking up from the state of sleep before the first time. As such, the UE 115 may calibrate a notch filter to suppress the spur before the base station 105 begins transmitting the downlink transmissions. Thus, the UE 115 may use the calibrated notch filter to mitigate interference from the spur, thereby enabling the UE 115 to receive the downlink transmission from the base station 105 with improved reliability. In some examples, the UE 115 may calibrate the notch filter based on tracking one or more characteristics of the spur. For example, the UE 115 may track one or more of an amplitude, a frequency, or a phase associated with the spur. Additionally or alternatively, the UE 115 may calibrate the notch filter based on configuring the notch filter with multiple filtering coefficients as further described with reference to FIG. 2. In some examples, the UE 115 may perform interference measurements to determine whether the notch filter has converged on the spur. That is, the UE 115 may determine whether the notch filter is effectively filtering (e.g., suppressing) the spur based on the interference measurements. In some examples, if the notch filter has not converged on the spur prior to the first time, the UE 115 may continue to calibrate the notch filter after the first time (e.g., while receiving the downlink transmission from the base station 105). Thus, waking up and calibrating the notch filter prior to the first time may enable the UE 115 to mitigate interference from the spur with improved efficiency and greater precision, among other benefits.

Figure 2:
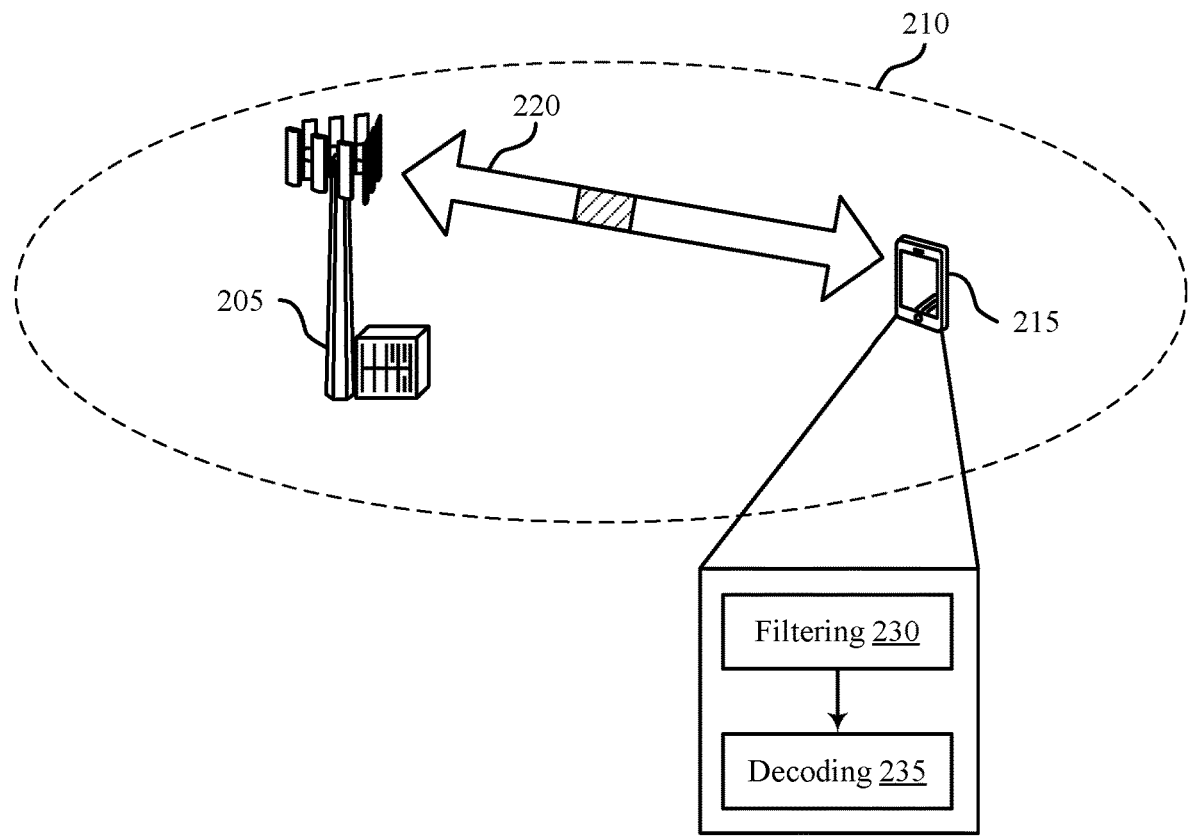
FIG. 2 illustrates an example of a wireless communications system that supports techniques for pre-opening notch filter in wireless communications system in accordance with various aspects of the present disclosure.
Figure 2:

FIG. 2 illustrates an example of a wireless communications system 200 that supports techniques for pre-opening notch filter in wireless communications system in accordance with various aspects of the present disclosure. The wireless communications system 200 may implement or be implemented by aspects of the wireless communications system 100. For example, the wireless communications system 200 may include a UE 215 and a base station 205, which may be examples of a UE 115 and a base station 105 as described with reference to FIG. 1. In the wireless communications system 200, the UE 215 and the base station 205 may communicate over a communication link 220 within a geographic coverage area 210 of the base station 205. The communication link 220 may be an example of a communication link 125 as described with reference to FIG. 1. Additionally or alternatively, the geographic coverage area 210 may be an example of a geographic coverage area 110 as described with reference to FIG. 1. In accordance with various aspects of the present disclosure, the UE 215 may activate a notch filter prior to one or more scheduled communications with the base station 205 and may use the activated notch filter to suppress or otherwise reduce a spur (e.g., interference) generated at the UE 215.

In some wireless communications systems, such as LTE systems, 5G NR systems, mmW systems, Wi-Fi systems, or V2X systems, a wireless device (e.g., a modem) may generate undesired internal signals while communicating with other wireless devices. These undesired signals, equivalently referred to herein as spurs, may adversely affect performance of the wireless device. For example, spurs generated at the wireless device may interfere with pilot signals (e.g., control signals, synchronization signals) transmitted in relatively small resource allocations or resource allocations associated with relatively high modulation and coding schemes (MCSs), thereby degrading performance of the wireless device. In some cases, to reduce adverse effects caused by a spur, the wireless device (e.g., UE 215) may employ specialized hardware components to improve isolation. That is, the wireless device may use the specialized hardware components to isolate the spur from other signals generated (or received) at the wireless device. However, these specialized hardware components may be associated with prohibitive costs and may not adhere to size limitations of the wireless device.

In some cases, to mitigate undesired internal signals without using relatively expensive and relatively large specialized hardware components, a receiver at the wireless device may handle undesired internal signals (e.g., residual spurs). More specifically, the receiver may employ a notch filter to filter out (e.g., suppress) spurs generated at the wireless device. To avoid saturation (e.g., when performing a Fast Fourier Transform (FFT)) and spur spreading in the frequency domain, the wireless device may use the notch filter to handle (e.g., filter) spurs in the time domain. More specifically, the wireless device may perform measurements of a spur and may configure the notch filter to converge on the spur based on the performed measurements. For example, the wireless device may measure one or more of a frequency, a phase, or an amplitude of the spur and may configure the notch filter to filter out (e.g., remove) signals with the measured frequency, phase, or amplitude.

In some cases, however, there may be a trade-off between a preciseness of the notch filter (e.g., how precise the notch filter is) a convergence time for the notch filter (e.g., a time the notch filter takes to converge on the spur). In other words, there may be an inverse relationship between convergence speed and distortion caused by the notch filter. As such, configuring the notch filter with a greater precision may be associated with a longer convergence time. In such cases, the wireless device may use a technique known as gear shifting to reduce the convergence time of the notch filter while maintaining a relatively high precision.

The gear shifting technique may enable the wireless device to calibrate the notch filter more efficiently such that it converges on the spur and reduces interference. To effectively perform gear shifting, the wireless device may measure and track characteristics of the spur. In some aspects, gear shifting may speed up convergence of the notch filter to the spur. To perform gear shifting, the wireless device may iteratively configure the notch filter with increasing filtering coefficients (e.g., K values) until the notch filter has successfully converged on the spur. More specifically, the wireless device may increase a filtering coefficient (e.g., a convergence gear) of the notch filter based on a sample index corresponding to a measurement of the spur. In some cases, however, the notch filter may take a relatively long time to converge on the spur with an accuracy that avoids signal distortion (e.g., due to a frequency response of the notch filter), even when applying gear shifting techniques.

In some cases, Equation 1, shown below, may be used to determine a convergence gear (e.g., a filtering coefficient K) for the notch filter. More specifically, Equation 1 may represent a machine learning (ML) mean estimator function used to perform gear shifting at the wireless device.

$$\hat{d}[n] = \frac{1}{N}\sum_{k=1}^{N} x[k] \quad (1)$$

In Equation 1, k and n may refer to sample numbers, and d and x may represent different signals at the wireless device. Equations 2 through 6, shown below, may illustrate relationships derived from Equation 1.

$$\hat{d}[1] = x[1] \quad (2)$$

$$\hat{d}[2] = \frac{\hat{d}[1] \cdot 1 + x[1]}{2} \quad (3)$$

$$\hat{d}[n] = \frac{\hat{d}[n-1] \cdot (n-1) + x[n-1]}{n} = \hat{d}[n-1] + \frac{1}{n} \cdot (x[n-1] - \hat{d}[n-1]) \quad (4)$$

$$\hat{d} - \hat{d} \cdot z^{-1}(1-\alpha) = \alpha \cdot z^{-1} \cdot x \quad (5)$$

$$\frac{\hat{d}}{x} = \frac{\alpha \cdot z^{-1}}{1 - z^{-1}(1-\alpha)} \quad (6)$$

In Equations 2 through 6, n may refer to a sample number, d and x may represent different signals at the wireless device, and z and a may represent filtering variables. In addition, the wireless device may use Equations 7 through 11, shown below, to further configure the notch filter. These equations may be used to calculate a signal at the wireless device after removing a specific component (e.g., a direct current (DC) component) from the signal and estimating a frequency shift of the signal.

$$y[n] = x[n] - \hat{d}[n] \quad (7)$$

$$y = x \cdot \left(1 - \frac{\hat{d}}{x}\right) = x \cdot \left(1 - \frac{\alpha \cdot z^{-1}}{1 - z^{-1} \cdot (1-\alpha)}\right) = x \cdot \left(\frac{1 - z^{-1} \cdot (1-\alpha) - \alpha \cdot z^{-1}}{1 - z^{-1} \cdot (1-\alpha)}\right) \quad (8)$$

$$\frac{y}{x} = \frac{1 - z^{-1}}{1 - z^{-1}(1-\alpha)} \quad (9)$$

$$\frac{y}{x} = \frac{1 - z^{-1} \cdot e^{-j\zeta}}{1 - z^{-1} \cdot e^{-j\zeta} \cdot (1-\alpha)} \quad (10)$$

$$y[n] = x[n] - e^{-j\zeta} \cdot (x[n-1] + (1-\alpha) \cdot y[n-1]) \quad (11)$$

In Equations 7 through 11, n may refer to a sample number, d and x may represent different signals at the wireless device, z and a may represent filtering variables, y may refer to a filtered signal at the wireless device, and may be a variable used to estimate a shifted signal (e.g., shifted in frequency) at the wireless device. Additionally or alternatively, the wireless device may quantize a using a relationship $$\left(\text{e.g., } \alpha = \frac{1}{n} \cong 2^{-K}\right),$$

and may apply different filtering coefficients (e.g., different K values) to the notch filter to attain a desired convergence state. Thus, the wireless device may use gear shifting to speed up the convergence of the notch filter's state to a spur. In some cases, however, the notch filter may be unable to converge on the spur if another signal (e.g., noise or data) is present at the wireless device. In such cases, the notch filter may converge on a combination of the spur and the other signal rather than converging on the spur alone. Thus, calibrating the notch filter in the presence of other signals may result in a relatively longer convergence period, thereby degrading performance of the notch filter. For example, calibrating the notch filter in the absence of other signals may result in a relatively short convergence time (e.g., a few microseconds), whereas calibrating the notch filter in the presence of other signals may result in a relatively long convergence time (e.g., tens of milliseconds).

In some cases, the wireless device may calibrate the notch filter in the presence of other signals based on pre-loading a state of the notch filter with a set of previously determined values corresponding to the spur. In such cases, the wireless device may configure the notch filter with a filtering coefficient that is large enough to reduce adverse effects of the spur. However, if the wireless device is entering a state of sleep (e.g., deep sleep mode), a phase of the spur may be unknown when the wireless device wakes up from the sleep. For example, one or more PLLs used by the wireless device to track at least one of a phase, a frequency, or an amplitude of the spur may be deactivated while the wireless device is in the sleep mode. In such cases, the wireless device may pre-load the state of notch filter with an erroneous phase value (e.g., random phase value). As a result, the notch filter may take relatively longer to converge on the spur, which may degrade performance of the wireless device.

Various aspects of the present disclosure provides for techniques for a UE to pre-open a notch filter after walking up from a state of sleep. A UE 215 experiencing a spur, may configure a notch filter to converge on the spur with a relatively faster convergence speed based on starting to configure the notch filter at a time when there are relatively fewer signals arriving at the UE 215. In some examples, the UE 215 may be scheduled to receive one or more downlink transmissions 225 from the base station 205. In such cases, the UE 215 may begin configuring the notch filter prior to the reception of the one or more downlink transmissions 225 such that the notch filter can converge on the spur rather than converging on a combination of the spur and the one or more downlink transmissions 225. In some examples, the techniques described herein may enable the UE 215 to calibrate the notch filter with an improved convergence speed even if the UE 215 is waking up from a state of sleep. For example, if the UE 215 is in a state of sleep and is scheduled to receive one or more downlink transmissions 225 from the base station 205 at a first time, the UE 215 may wake up from the state of sleep and activate (e.g., pre-open) the notch filter before the first time such that the notch filter can converge on the spur before the one or more downlink transmissions 225 arrive at the UE 215. That is, the notch filter may converge on the spur before data (e.g., the one or more downlink transmissions 225) arrives at the UE 215.

In some examples, the UE 215 may configure the notch filter based on performing gear shifting without pre-loading a state of the notch filter. As such, the notch filter may have a higher likelihood of successfully converging on the spur. In other words, the notch filter may be configured with a relatively high gear shifting coefficient when the one or more downlink transmissions 225 arrive at the UE 215. As a result, the UE 215 may be able to reduce adverse effects of the spur on the one or more downlink transmissions 225. Moreover, the UE 215 may be able to effectively suppress the spur within a time period (e.g., less than one slot) of waking up from the state of sleep. In contrast, if the UE 215 attempts to configure the notch filter while receiving the one or more downlink transmissions 225, the notch filter may take a relatively longer time (e.g., multiple slots) to converge on the spur.

In some examples, the UE 215 may configure the notch filter with improved accuracy while operating in radio frequency spectrum bands that are associated with relatively lower noise levels. For example, if the UE 215 is operating in a mmW radio frequency spectrum band, the mmW radio frequency spectrum band may be thermally limited and not interference limited. That is, external interference levels associated with the mmW radio frequency spectrum band may be lower than interference levels associated with the spur. As such, the notch filter may converge on the spur alone rather than a combination of the spur and noise from the mmW radio frequency spectrum band. Thus, the UE 215 may configure the notch filter more efficiently in thermally limited environments such as mmW radio frequency spectrum bands. However, it is to be understood that the techniques described herein may also be employed in other radio frequency spectrum bands.

Aspects of the present disclosure may be implemented to improve filtering operations 230 and decoding operations 235 at the UE 215. For example, the UE 215 may receive one or more downlink grants scheduling the one or more downlink transmissions 225. Upon receiving the one or more downlink grants, the UE 215 may activate a notch filter at a first time that is at least a threshold period of time prior to a beginning of a first downlink grant (i.e., the UE 215 may activate the notch filter a threshold period of time prior to beginning of reception of the one or more downlink transmissions 225). By activating the notch filter at the first time, the UE 215 may filter out the spur prior to reception of the one or more downlink transmissions 225. If the UE 215 is scheduled to receive one or more downlink transmissions 225 after waking up from a state of sleep, the UE 215 may perform decoding operations 235 on the one or more downlink transmissions 225 with improved reliability based on waking from the state of sleep and calibrating a notch filter prior to the reception of the one or more downlink transmissions 225. Calibrating the notch filter before the one or more downlink transmissions 225 may enable the UE 215 to perform reception (filtering and decoding) of the one or more downlink transmissions 225 with relatively greater efficiency. As a result, the UE 215 may be able to filter the spur from the one or more downlink transmissions 225 with relatively higher precision, thereby increasing the likelihood of the UE 215 successfully performing the decoding operations 235 on the one or more downlink transmissions 225.

Figure 3:
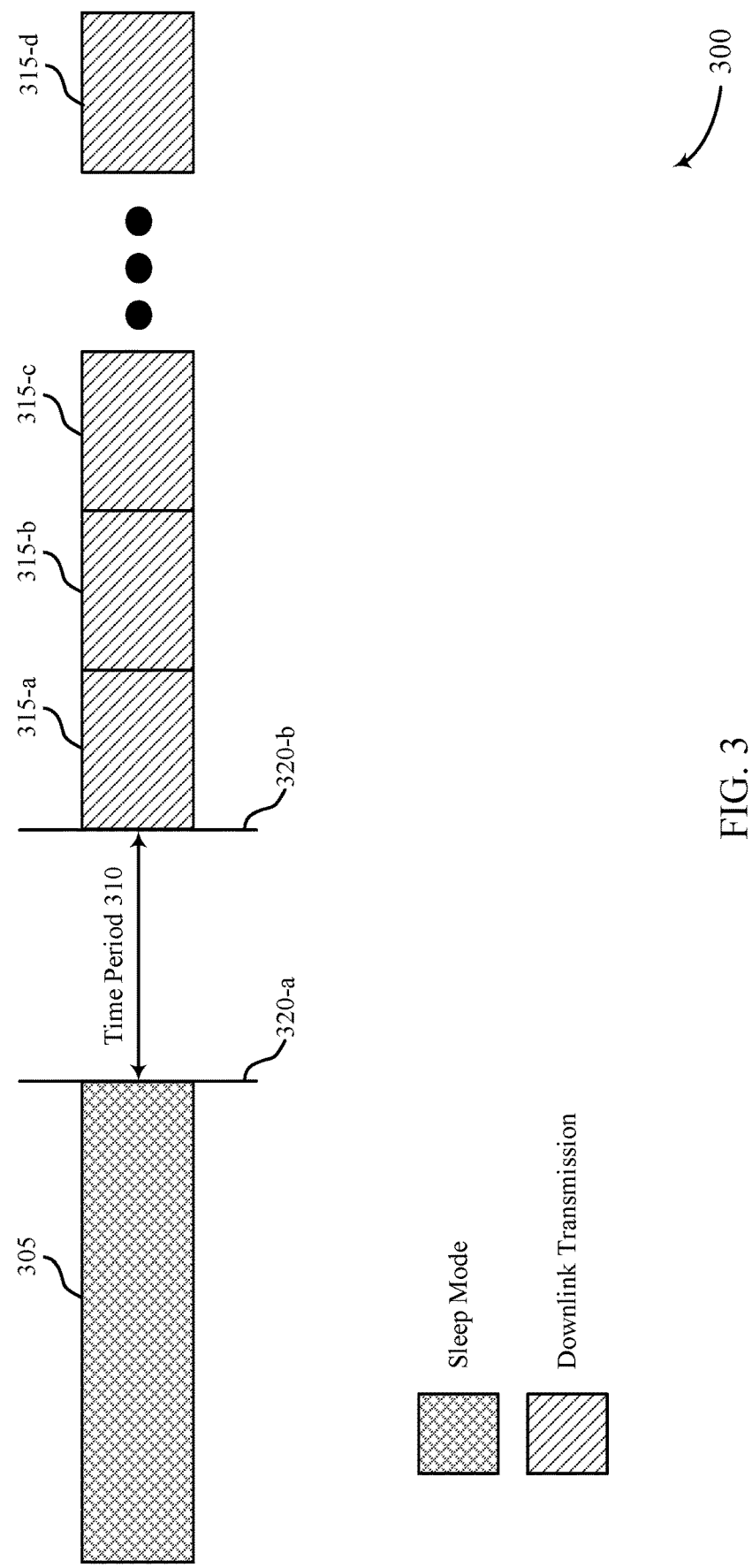
FIG. 3 illustrates an example of a communications scheme that supports techniques for pre-opening notch filter in wireless communications system in accordance with various aspects of the present disclosure.

FIG. 3 illustrates an example of a communications scheme 300 that supports techniques for pre-opening notch filter in wireless communications system in accordance with various aspects of the present disclosure. The communications scheme 300 may implement or be implemented by aspects of the wireless communications system 100 or the wireless communications system 200. For example, the communications scheme 300 may be implemented by a UE 115, which may be an example of a corresponding device as described with reference to FIG. 1. In accordance with the communications scheme 300, the UE 115 may wake up from a state of sleep 305 and may activate a notch filter at a first time 320-*a* that is before a second time 320-*b* at which the UE 115 is scheduled to receive one or more downlink transmissions 315 from a base station 105.

As depicted herein, the UE 115 may experience a spur (or interference) while communicating with the base station 105. For example, the UE 115 may generate an undesired signal that interferes with a downlink transmission from the base station 105. In some cases, the UE 115 may employ a notch filter to suppress the spur. For example, the UE 115 may use one or more PLLs to measure at least one of a phase, a frequency, or an amplitude of the spur and may calibrate the notch filter based on these measured values. As a result, the notch filter may suppress signals with the measured phase, frequency, or amplitude, and may not affect other signals (e.g., communications from the base station 105). In some cases, the UE 115 may use gear shifting techniques to configure the notch filter, as described with reference to FIG. 2. That is, the UE 115 may iteratively configure the notch filter with increasing filtering coefficients until the notch filter has converged on the spur. In some cases, the UE 115 may determine that the notch filter has converged on the spur based on performing interference measurements of the spur.

In some cases, the UE 115 may receive one or more downlink grants from the base station 105. The one or more downlink grants may schedule one or more downlink transmissions 315 from the base station 105. In some cases, however, the UE 115 may enter a state of sleep 305 (e.g., deep sleep) prior to the reception of the one or more downlink transmissions 315 scheduled by the one or more downlink grants (e.g., to reduce power consumption). While the UE 115 is in the state of sleep 305 (e.g., sleep mode), the one or more PLLs at the UE 115 may be deactivated. As a result, the UE 115 may be unable to use the one or more PLLs to track various characteristics (e.g., phase, amplitude, frequency) of the spur. Thus, the UE 115 may be unable to filter the spur while in the state of sleep 305. Additionally or alternatively, if the UE 115 performs a low noise amplifier (LNA) state change, a radio frequency front end (FE) state change, an analog digital converter (ADC) state change, or a combination thereof, the one or more PLLs at the UE 115 may become desynchronized, thereby preventing the UE 115 from tracking and filtering the spur.

In accordance with various aspects of the present disclosure, the UE 115 may wake up from the state of sleep 305 at a first time 320-a that is before a second time 320-b at which the UE 115 is scheduled to receive the one or more downlink transmissions 315. After waking up from the state of sleep 305 (e.g., sleep mode) at the first time 320-a, the UE 115 may pre-open (e.g., activate) a notch filter and may configure the notch filter to suppress a spur generated at the UE 115. In some examples, the UE 115 may configure the notch filter to filter out the spur during a time period 310. In some examples, a duration of the time period 310 may be less than a symbol. In some examples, the UE 115 may pre-open the notch filter at the first time 320-a if the power level is less than a threshold (i.e., the UE 115 determines that there is no external interference and the notch filter may be converged).

After the time period 310, the UE 115 may begin receiving the one or more downlink transmissions 315 at the second time 320-b. For example, the UE 115 may receive a downlink transmission 315-a, a downlink transmission 315-b, a downlink transmission 315-c, and a downlink transmission 315-d from the base station 105. In some examples, configuring the notch filter prior to the second time 320-b at which the UE 115 begins receiving the one or more downlink transmissions 315 from the base station 105 may enable the notch filter to converge on the spur with a faster convergence speed (e.g., compared to configuring the notch filter at second time 320-b while receiving the one or more downlink transmissions 315). As a result, the UE 115 may receive the one or more downlink transmissions 315 from the base station 105 with improved reliability, among other benefits.

In some examples, the UE 115 may determine that the notch filter has converged on the spur based on performing one or more interference measurements of the spur. For example, the UE 115 may identify that the notch filter has attained a threshold accuracy based on performing the one or more interference measurements. In some examples, the UE 115 may determine that the notch filter has attained the threshold accuracy prior to the second time 320-b at which the UE 115 is scheduled to begin receiving the one or more downlink transmissions 315. Alternatively, if the UE 115 determines that the notch filter has not attained the threshold accuracy prior to the second time 320-b, the UE 115 may continue to calibrate the notch filter after beginning to receive the one or more downlink transmissions 315 from the base station 105.

In some examples, the UE 115 may be operating in a mmW radio frequency spectrum band that is associated with a thermally limited link budget. That is, the mmW radio frequency spectrum band may have relatively low noise levels. In some examples, the UE 115 may perform a set of channel measurements of the mmW radio frequency spectrum band and may determine that noise levels in the mmW radio frequency spectrum band are low (e.g., in comparison to the spur) based on the set of channel measurements. In such examples, the UE 115 may be able to calibrate the notch filter with greater accuracy because the notch filter may converge on the spur rather than a combination of the spur and external noise. Additionally or alternatively, the techniques described herein may enable the UE to experience improved performance while using a relatively high MCS, a relatively small resource allocation, or both. More specifically, the UE 115 may experience improved performance during a time interval (e.g., tens of slots) after the first time 320-a at which the UE 115 wakes up from the state of sleep 305.

Figure 4:
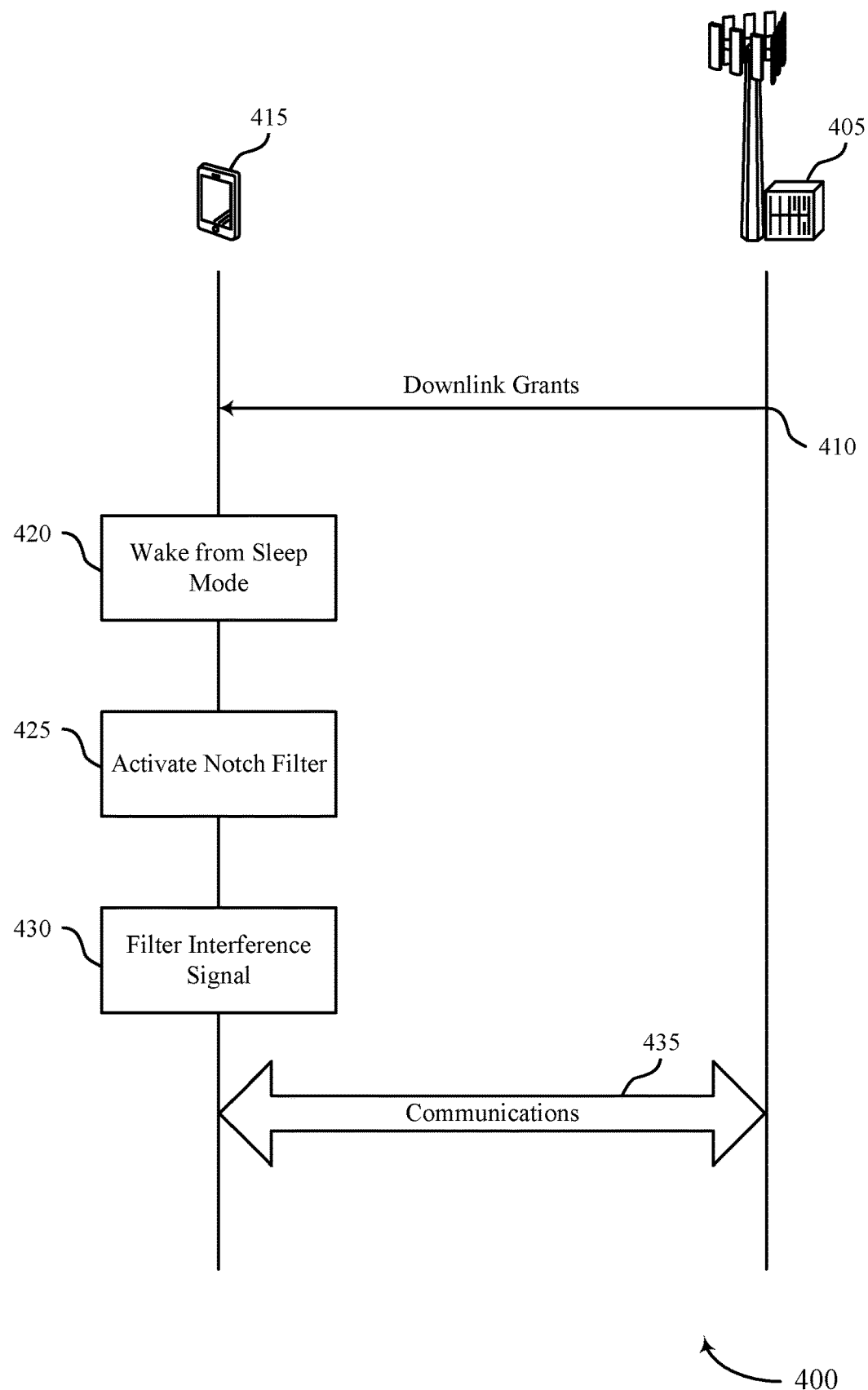
FIG. 4 illustrates an example of a process flow that supports techniques for pre-opening notch filter in wireless communications system in accordance with various aspects of the present disclosure.

FIG. 4 illustrates an example of a process flow 400 that supports techniques for pre-opening notch filter in wireless communications system in accordance with various aspects of the present disclosure. The process flow 400 may implement or be implemented by aspects of the wireless communications system 100 or the wireless communications system 200. For example, the process flow 400 may illustrate communications between a UE 415 and a base station 405, which may be examples of corresponding devices as described with reference to FIGS. 1 and 2.

In the following description of the process flow 400, operations between the UE 415 and the base station 405 may be performed in a different order or at a different time than as shown. Some operations may also be omitted from the process flow 400, and other operations may be added to the process flow 400. In accordance with the process flow 400, the UE 415 may activate a notch filter to suppress a spur generated at the UE 415 prior to one or more scheduled communications between the UE 415 and the base station 405. As such, the UE 415 may perform the one or more scheduled communications with improved reliability, among other benefits.

At 410, the UE 415 may receive one or more downlink grants from the base station 405. The one or more downlink grants may schedule one or more corresponding downlink transmissions from the base station 405 to the UE 415. In some examples, to conserve power, the UE 415 may enter a sleep mode (e.g., a state of deep sleep) before attempting to receive the one or more corresponding downlink transmissions scheduled by the one or more downlink grants. While in the sleep mode, the UE 415 may deactivate one or more PLLs at the UE 415. Additionally or alternatively, the UE 415 may perform an LNA state change, an analog FE state change, an ADC state change, or a combination thereof, which may result in the one or more PLLs at the UE 415 being deactivated or reconfigured.

At 420, the UE 415 may wake from the sleep mode at a first time that is a threshold period of time prior to a second time at which the UE 415 is scheduled to begin receiving the one or more downlink transmissions from the base station 405. In some examples, the UE 415 may detect a spur based on waking up from the sleep mode. More specifically, the UE 415 may activate the one or more PLLs at the UE 415 and may use the activated PLLs to measure one or more characteristics of the spur. For example, the UE 415 may identify at least one of an amplitude, a frequency, or a phase of the spur based on using the activated PLLs to measure the spur.

At 425, the UE 415 may activate (e.g., pre-open) a notch filter based on waking from the sleep mode and detecting the spur. In some examples, the UE 415 may configure the notch filter with a plurality of filtering coefficients between the first time (e.g., when the UE 415 wakes up from the sleep mode) and the second time (e.g., when the UE 415 is scheduled to begin receiving the one or more downlink transmissions from the base station 405). This technique, also known as gear shifting, may enable the notch filter to converge on the spur relatively faster and with relatively less signal distortion. In some examples, prior to activating the notch filter, the UE 415 may perform a set of channel measurements. For example, the UE 415 may perform a set of channel measurements to determine noise levels of a radio frequency spectrum band in which the UE 415 is operating or in which the UE 415 is scheduled to receive the one or more downlink transmissions from the base station 405.

At 430, the UE 415 may use the activated notch filter to filter out (e.g., suppress) the spur generated at the UE 415. In some examples, the UE 415 may determine that the notch filter has converged on the spur based on performing interference measurements of the spur. That is, the UE 415 may perform interference measurements of the spur and may determine that the notch filter has attained a threshold accuracy based on the interference measurements. In some examples, the UE 415 may determine that the notch filter has converged on the spur prior to the second time at which the UE 415 is scheduled to begin receiving the one or more downlink transmissions from the base station 405.

At 435, the UE 415 may communicate with the base station 405 in accordance with the one or more downlink grants and based on using the activated notch filter to suppress the spur. For example, the UE 415 may receive the one or more downlink transmissions scheduled by the one or more downlink grants. In some examples, the UE 415 may continue to calibrate the notch filter after initiating reception of the one or more downlink transmissions. That is, the UE 415 may continue configuring the notch filter with increasing filtering coefficients if the notch filter has not attained an accuracy threshold prior to the one or more downlink transmissions. In some examples, waking up and configuring the notch filter prior to the one or more downlink transmissions may enable the UE 415 to calibrate the notch filter with relatively higher precision and a relatively faster convergence time, thereby enabling the UE 415 to receive the one or more downlink transmissions from the base station 405 with improved reliability, among other benefits.

Figure 5:
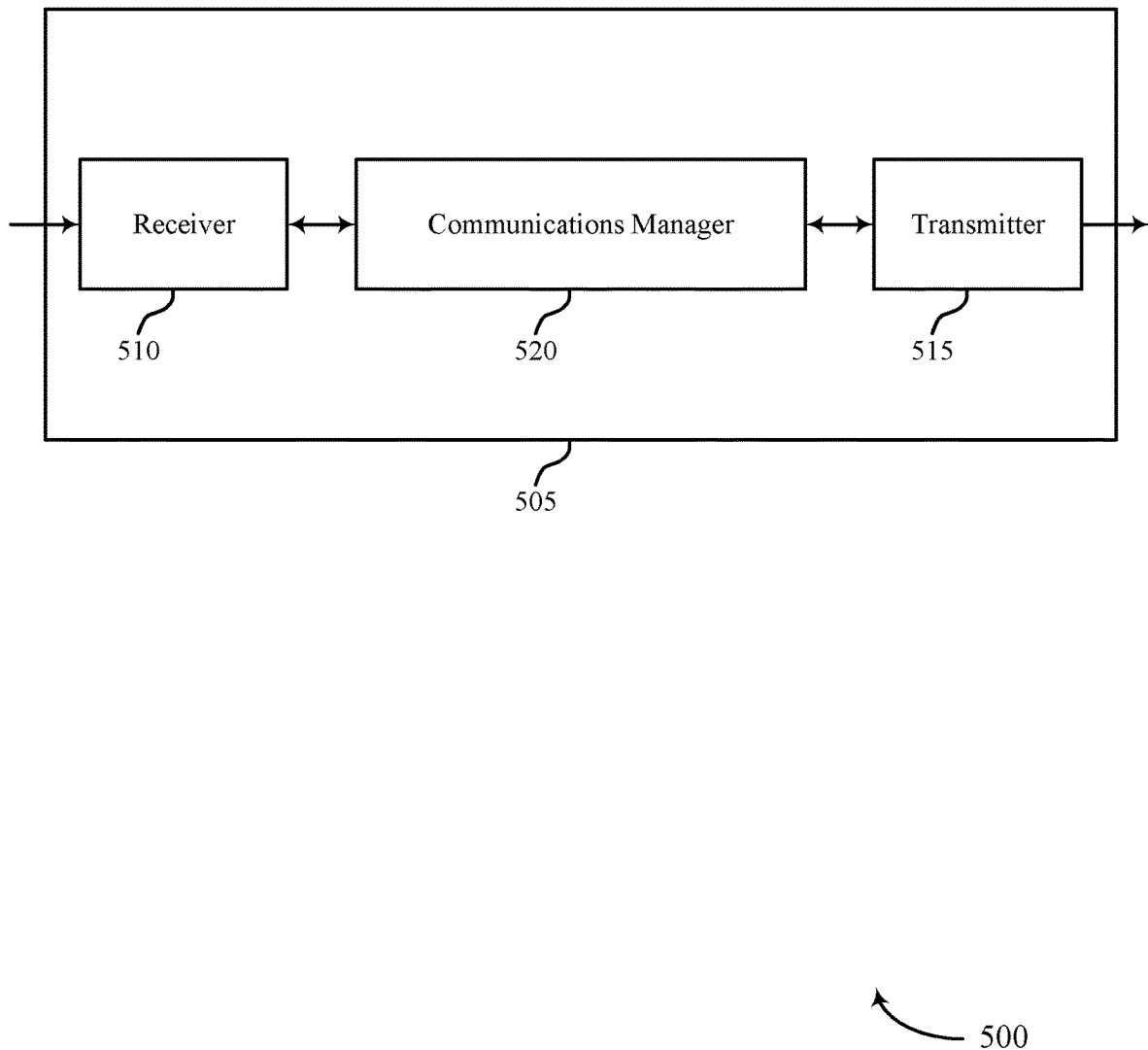
FIG. 5 shows a block diagram of a device that supports techniques for pre-opening notch filter in wireless communications system in accordance with various aspects of the present disclosure.

FIG. 5 shows a block diagram 500 of a device 505 that supports techniques for pre-opening notch filter in wireless communications system in accordance with various aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for pre-opening notch filter in wireless communications system). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for pre-opening notch filter in wireless communications system). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for pre-opening notch filter in wireless communications system as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving one or more downlink grants. The communications manager 520 may be configured as or otherwise support a means for activating a notch filter at a first time, where the first time is at least a threshold period of time prior to a beginning of a first downlink grant of the one or more downlink grants. The communications manager 520 may be configured as or otherwise support a means for filtering interference from a signal at the UE using the activated notch filter. The communications manager 520 may be configured as or otherwise support a means for communicating with a base station in accordance with the one or more downlink grants and based on filtering the interference.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing based on reducing a convergence time of a notch filter at the device 505. Reducing the convergence time of the notch filter may enable the device 505 to allocate fewer processing resources to calibrating the notch filter, thereby reducing processing overhead at the device 505.

Figure 6:
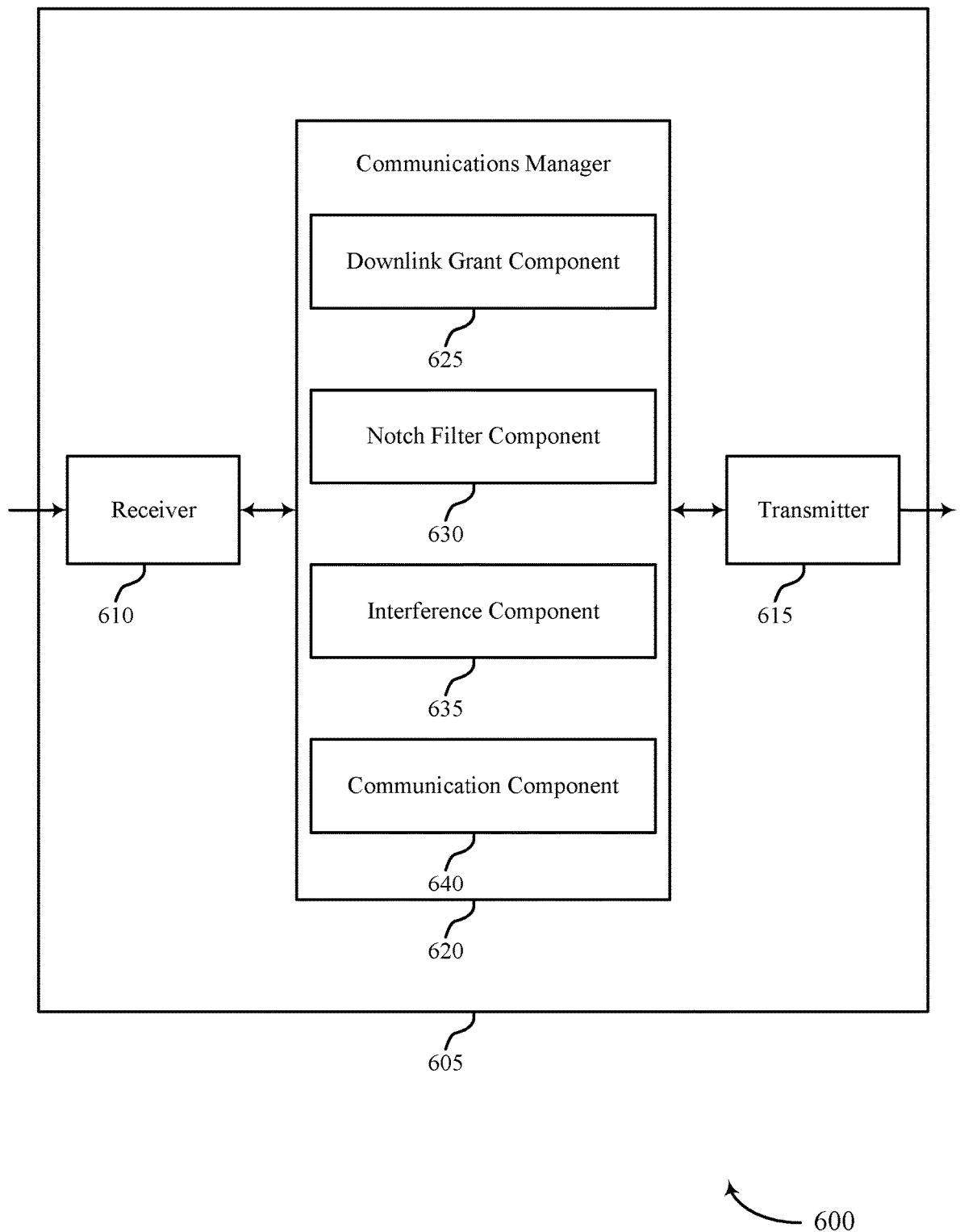
FIG. 6 shows a block diagram of a device that supports techniques for pre-opening notch filter in wireless communications system in accordance with various aspects of the present disclosure.

FIG. 6 shows a block diagram 600 of a device 605 that supports techniques for pre-opening notch filter in wireless communications system in accordance with various aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for pre-opening notch filter in wireless communications system). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for pre-opening notch filter in wireless communications system). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for pre-opening notch filter in wireless communications system as described herein. For example, the communications manager 620 may include a downlink grant component 625, a notch filter component 630, an interference component 635, a communication component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The downlink grant component 625 may be configured as or otherwise support a means for receiving one or more downlink grants. The notch filter component 630 may be configured as or otherwise support a means for activating a notch filter at a first time, where the first time is at least a threshold period of time prior to a beginning of a first downlink grant of the one or more downlink grants. The interference component 635 may be configured as or otherwise support a means for filtering interference from a signal at the UE using the activated notch filter. The communication component 640 may be configured as or otherwise support a means for communicating with a base station in accordance with the one or more downlink grants and based on filtering the interference.

Figure 7:
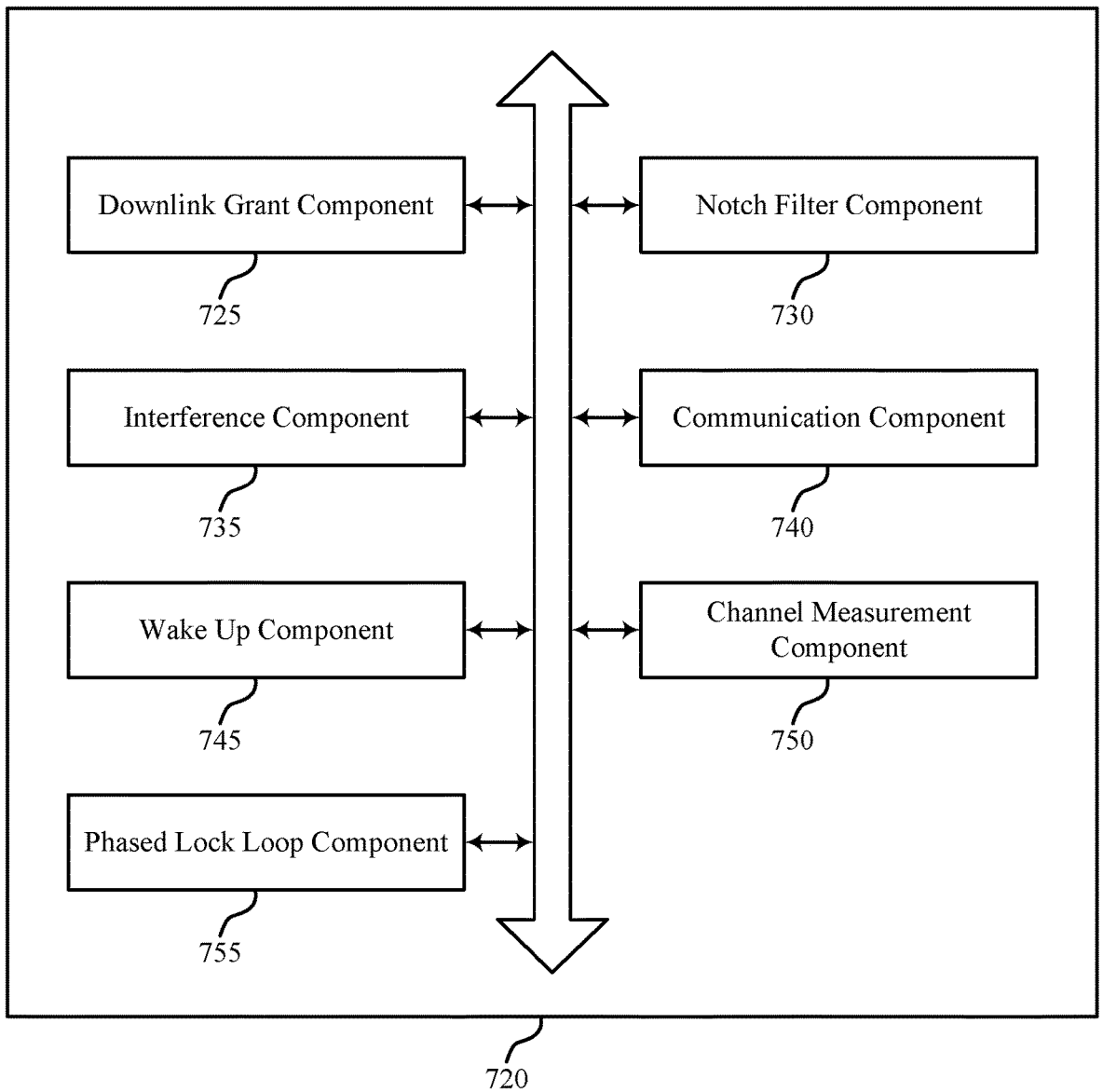
FIG. 7 shows a block diagram of a communications manager that supports techniques for pre-opening notch filter in wireless communications system in accordance with various aspects of the present disclosure.

FIG. 7 shows a block diagram 700 of a communications manager 720 that supports techniques for pre-opening notch filter in wireless communications system in accordance with various aspects of the present disclosure. The communications manager 720 may be an example of aspects of a communications manager 520, a communications manager 620, or both, as described herein. The communications manager 720, or various components thereof, may be an example of means for performing various aspects of techniques for pre-opening notch filter in wireless communications system as described herein. For example, the communications manager 720 may include a downlink grant component 725, a notch filter component 730, an interference component 735, a communication component 740, a wake up component 745, a channel measurement component 750, a phased lock loop component 755, or any combination thereof. Each of these components may communicate, directly or indirectly, with one another (e.g., via one or more buses).

The communications manager 720 may support wireless communication at a UE in accordance with examples as disclosed herein. The downlink grant component 725 may be configured as or otherwise support a means for receiving one or more downlink grants. The notch filter component 730 may be configured as or otherwise support a means for activating a notch filter at a first time, where the first time is at least a threshold period of time prior to a beginning of a first downlink grant of the one or more downlink grants. The interference component 735 may be configured as or otherwise support a means for filtering interference from a signal at the UE using the activated notch filter. The communication component 740 may be configured as or otherwise support a means for communicating with a base station in accordance with the one or more downlink grants and based on filtering the interference.

In some examples, the wake up component 745 may be configured as or otherwise support a means for waking up from a state of sleep at the first time, where activating the notch filter is based on waking up from the state of sleep. In some examples, the interference component 735 may be configured as or otherwise support a means for measuring the interference after waking up from the state of sleep and activating the notch filter. In some examples, the interference component 735 may be configured as or otherwise support a means for identifying, based on measuring the interference, at least one of an amplitude of the interference, a frequency of the interference, or a phase of the interference, where filtering the interference at the UE is based on the amplitude of the interference, the frequency of the interference or the phase of the interference.

In some examples, the phased lock loop component 755 may be configured as or otherwise support a means for activating one or more analog PLLs based on waking up from the state of sleep. In some examples, the interference component 735 may be configured as or otherwise support a means for identifying the phase associated with the interference based on activating the one or more analog PLLs, where the one or more analog PLLs of the UE remain deactivated while the UE is in the state of sleep.

In some examples, the downlink grant component 725 may be configured as or otherwise support a means for determining a second time associated with the beginning of the first downlink grant, where the second time is later than the first time and a difference between the first time and the second time is greater than or equal to the threshold period of time. In some examples, to support filtering the interference, the interference component 735 may be configured as or otherwise support a means for filtering the interference after the second time associated with the beginning of the first downlink grant of the one or more downlink grants.

In some examples, the notch filter component 730 may be configured as or otherwise support a means for configuring the notch filter with a set of multiple filtering coefficients at the first time, where filtering the interference further includes filtering the interference using the configured notch filter. In some examples, the interference component 735 may be configured as or otherwise support a means for performing one or more measurements of the interference based on configuring the notch filter. In some examples, the notch filter component 730 may be configured as or otherwise support a means for determining that the configured notch filter satisfies an accuracy threshold based on the one or more measurements.

In some examples, the notch filter satisfies the accuracy threshold prior to second time associated with the beginning of the first downlink grant of the one or more downlink grants. In some examples, the channel measurement component 750 may be configured as or otherwise support a means for performing a set of channel measurements, where activating the notch filter includes activating the notch filter at the first time based on determining that the set of channel measurements satisfies a threshold.

In some examples, a convergence of the notch filter to the interference occurs prior to the beginning of the one or more downlink grants. In some examples, the interference includes a spur generated at the UE. In some examples, activating the notch filter at the first time is based on a low noise amplifier state change, an analog front end state change, an analog digital converter state change, a PLL reconfiguration, or a combination thereof.

Figure 8:
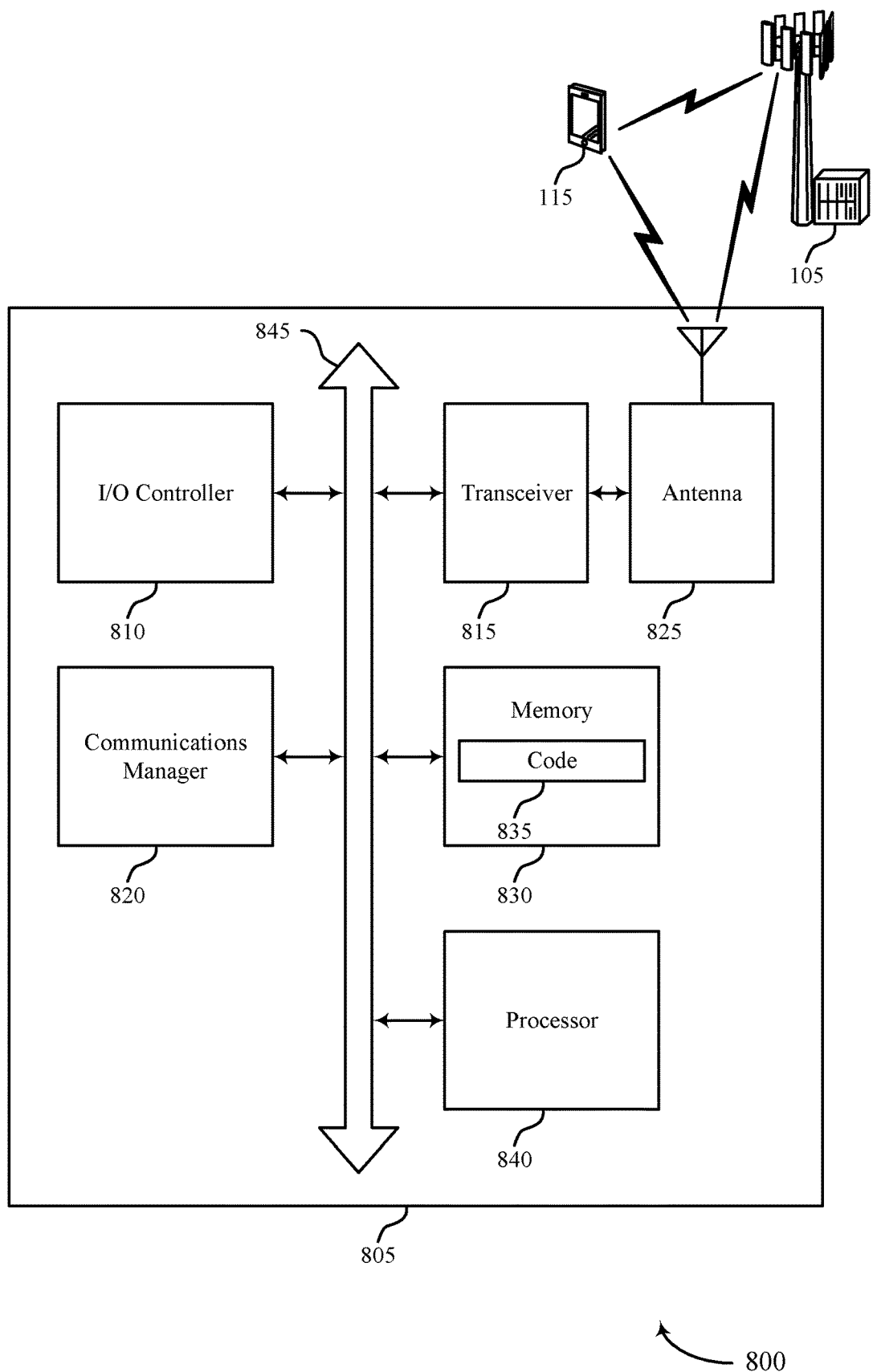
FIG. 8 shows a diagram of a system including a device that supports techniques for pre-opening notch filter in wireless communications system in accordance with various aspects of the present disclosure.

FIG. 8 shows a diagram of a system 800 including a device 805 that supports techniques for pre-opening notch filter in wireless communications system in accordance with various aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for pre-opening notch filter in wireless communications system). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving one or more downlink grants. The communications manager 820 may be configured as or otherwise support a means for activating a notch filter at a first time, where the first time is at least a threshold period of time prior to a beginning of a first downlink grant of the one or more downlink grants. The communications manager 820 may be configured as or otherwise support a means for filtering interference from a signal at the UE using the activated notch filter. The communications manager 820 may be configured as or otherwise support a means for communicating with a base station in accordance with the one or more downlink grants and based on filtering the interference.

By including or configuring the communications manager 820 in accordance with examples as described herein, the device 805 may support techniques for improved communication reliability based on increasing a convergence speed of a notch filter at the device 805. Increasing the convergence speed of the notch filter may enable the notch filter to converge on a spur generated at the device 805 in a relatively short time span. As a result, the device 805 may experience less interference from the spur.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for pre-opening notch filter in wireless communications system as described herein, or the processor 840 and the memory 830 may be otherwise configured to perform or support such operations.

Figure 9:
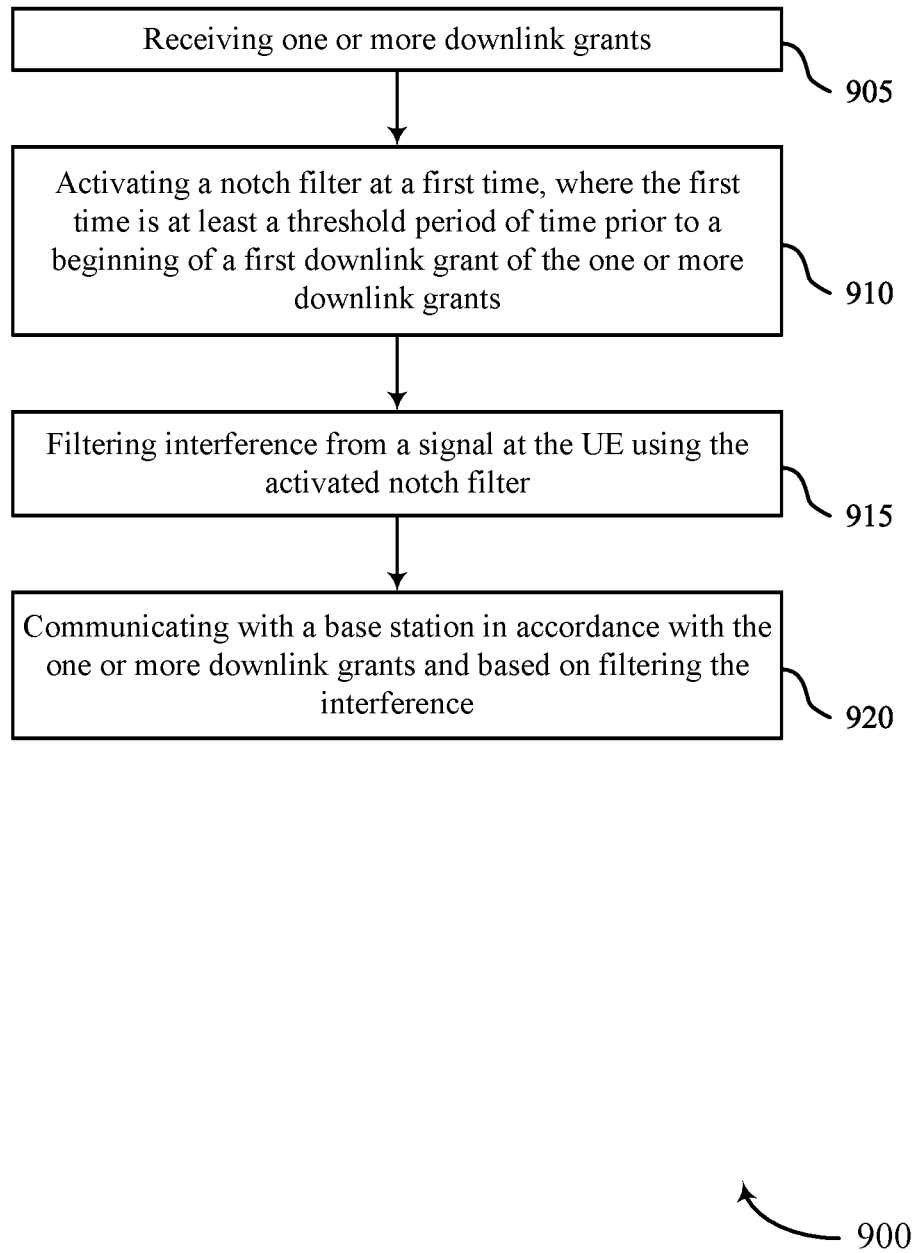
FIG. 9 shows a flowchart illustrating methods that support techniques for pre-opening notch filter in wireless communications system in accordance with various aspects of the present disclosure.

FIG. 9 shows a flowchart illustrating a method 900 that supports techniques for pre-opening notch filter in wireless communications system in accordance with various aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving one or more downlink grants. The operations of 905 may be performed in accordance with examples as disclosed herein. In some examples, aspects of the operations of 905 may be performed by a downlink grant component 725 as described with reference to FIG. 7.

At 910, the method may include activating a notch filter at a first time, where the first time is at least a threshold period of time prior to a beginning of a first downlink grant of the one or more downlink grants. The operations of 910 may be performed in accordance with examples as disclosed herein. In some examples, aspects of the operations of 910 may be performed by a notch filter component 730 as described with reference to FIG. 7.

At 915, the method may include filtering interference from a signal at the UE using the activated notch filter. The operations of 915 may be performed in accordance with examples as disclosed herein. In some examples, aspects of the operations of 915 may be performed by an interference component 735 as described with reference to FIG. 7.

At 920, the method may include communicating with a base station in accordance with the one or more downlink grants and based on filtering the interference. The operations of 920 may be performed in accordance with examples as disclosed herein. In some examples, aspects of the operations of 920 may be performed by a communication component 740 as described with reference to FIG. 7.

Figure 10:
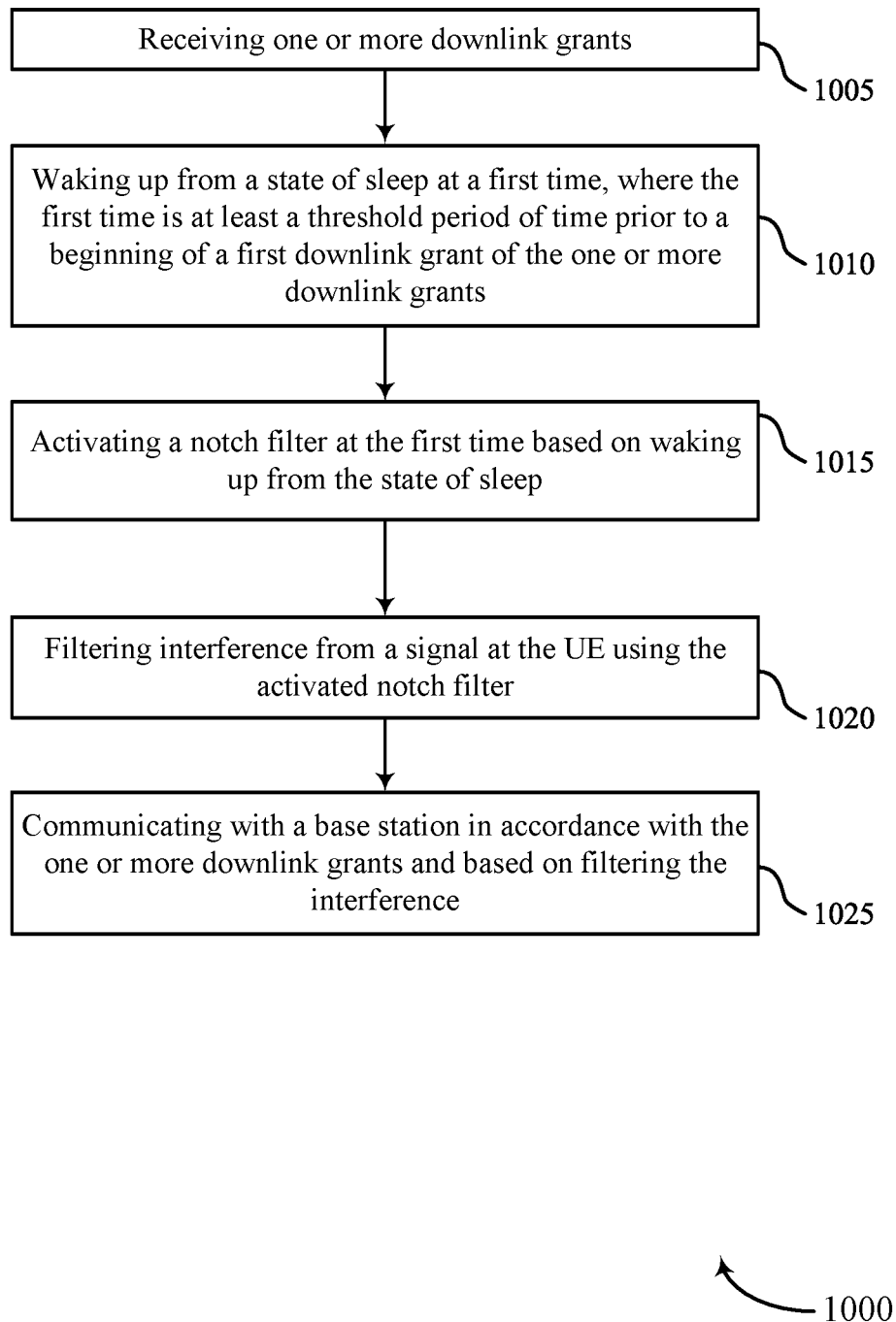
FIG. 10 shows a flowchart illustrating methods that support techniques for pre-opening notch filter in wireless communications system in accordance with various aspects of the present disclosure.

FIG. 10 shows a flowchart illustrating a method 1000 that supports techniques for pre-opening notch filter in wireless communications system in accordance with various aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving one or more downlink grants. The operations of 1005 may be performed in accordance with examples as disclosed herein. In some examples, aspects of the operations of 1005 may be performed by a downlink grant component 725 as described with reference to FIG. 7.

At 1010, the method may include waking up from a state of sleep at the first time, where activating the notch filter is based on waking up from the state of sleep. The operations of 1010 may be performed in accordance with examples as disclosed herein. In some examples, aspects of the operations of 1010 may be performed by a wake up component 745 as described with reference to FIG. 7.

At 1015, the method may include activating a notch filter at a first time based on waking up from the state of sleep. In some examples, the first time is at least a threshold period of time prior to a beginning of a first downlink grant of the one or more downlink grants. The operations of 1015 may be performed in accordance with examples as disclosed herein. In some examples, aspects of the operations of 1015 may be performed by a notch filter component 730 as described with reference to FIG. 7.

At 1020, the method may include filtering interference from a signal at the UE using the activated notch filter. The operations of 1020 may be performed in accordance with examples as disclosed herein. In some examples, aspects of the operations of 1020 may be performed by an interference component 735 as described with reference to FIG. 7.

At 1025, the method may include communicating with a base station in accordance with the one or more downlink grants and based on filtering the interference. The operations of 1025 may be performed in accordance with examples as disclosed herein. In some examples, aspects of the operations of 1025 may be performed by a communication component 740 as described with reference to FIG. 7.

Figure 11:
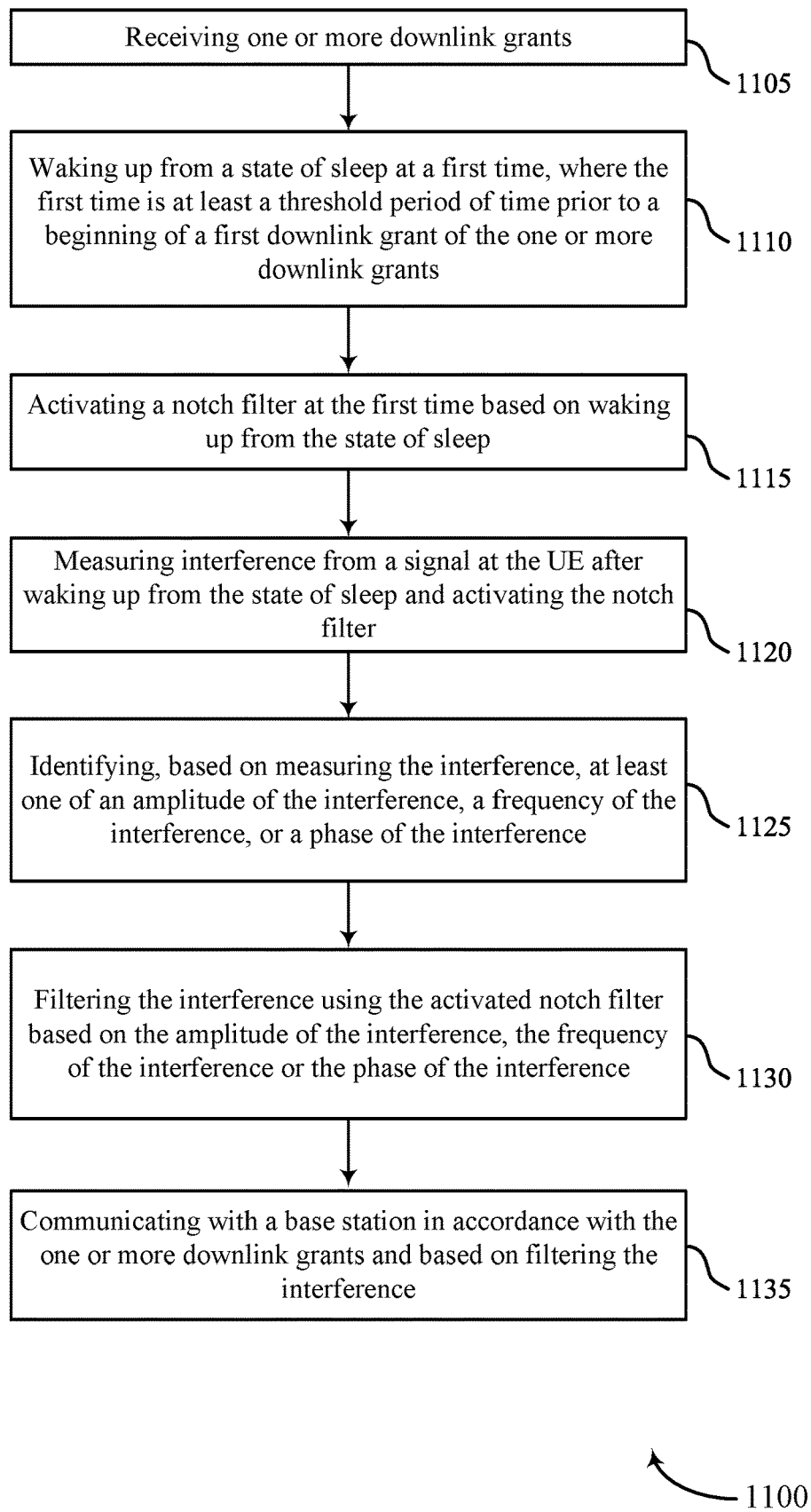
FIG. 11 shows a flowchart illustrating methods that support techniques for pre-opening notch filter in wireless communications system in accordance with various aspects of the present disclosure.

FIG. 11 shows a flowchart illustrating a method 1100 that supports techniques for pre-opening notch filter in wireless communications system in accordance with various aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving one or more downlink grants. The operations of 1105 may be performed in accordance with examples as disclosed herein. In some examples, aspects of the operations of 1105 may be performed by a downlink grant component 725 as described with reference to FIG. 7.

At 1110, the method may include waking up from a state of sleep at the first time, where activating the notch filter is based on waking up from the state of sleep. The operations of 1110 may be performed in accordance with examples as disclosed herein. In some examples, aspects of the operations of 1110 may be performed by a wake up component 745 as described with reference to FIG. 7.

At 1115, the method may include activating a notch filter at a first time, where the first time is at least a threshold period of time prior to a beginning of a first downlink grant of the one or more downlink grants. The operations of 1115 may be performed in accordance with examples as disclosed herein. In some examples, aspects of the operations of 1115 may be performed by a notch filter component 730 as described with reference to FIG. 7.

At 1120, the method may include measuring the interference after waking up from the state of sleep and activating the notch filter. The operations of 1120 may be performed in accordance with examples as disclosed herein. In some examples, aspects of the operations of 1120 may be performed by an interference component 735 as described with reference to FIG. 7.

At 1125, the method may include identifying, based on measuring the interference, at least one of an amplitude of the interference, a frequency of the interference, or a phase of the interference, where filtering the interference at the UE is based on the amplitude of the interference, the frequency of the interference or the phase of the interference. The operations of 1125 may be performed in accordance with examples as disclosed herein. In some examples, aspects of the operations of 1125 may be performed by an interference component 735 as described with reference to FIG. 7.

At 1130, the method may include filtering interference from a signal at the UE using the activated notch filter. The operations of 1130 may be performed in accordance with examples as disclosed herein. In some examples, aspects of the operations of 1130 may be performed by an interference component 735 as described with reference to FIG. 7.

At 1135, the method may include communicating with a base station in accordance with the one or more downlink grants and based on filtering the interference. The operations of 1135 may be performed in accordance with examples as disclosed herein. In some examples, aspects of the operations of 1135 may be performed by a communication component 740 as described with reference to FIG. 7.

Figure 12:
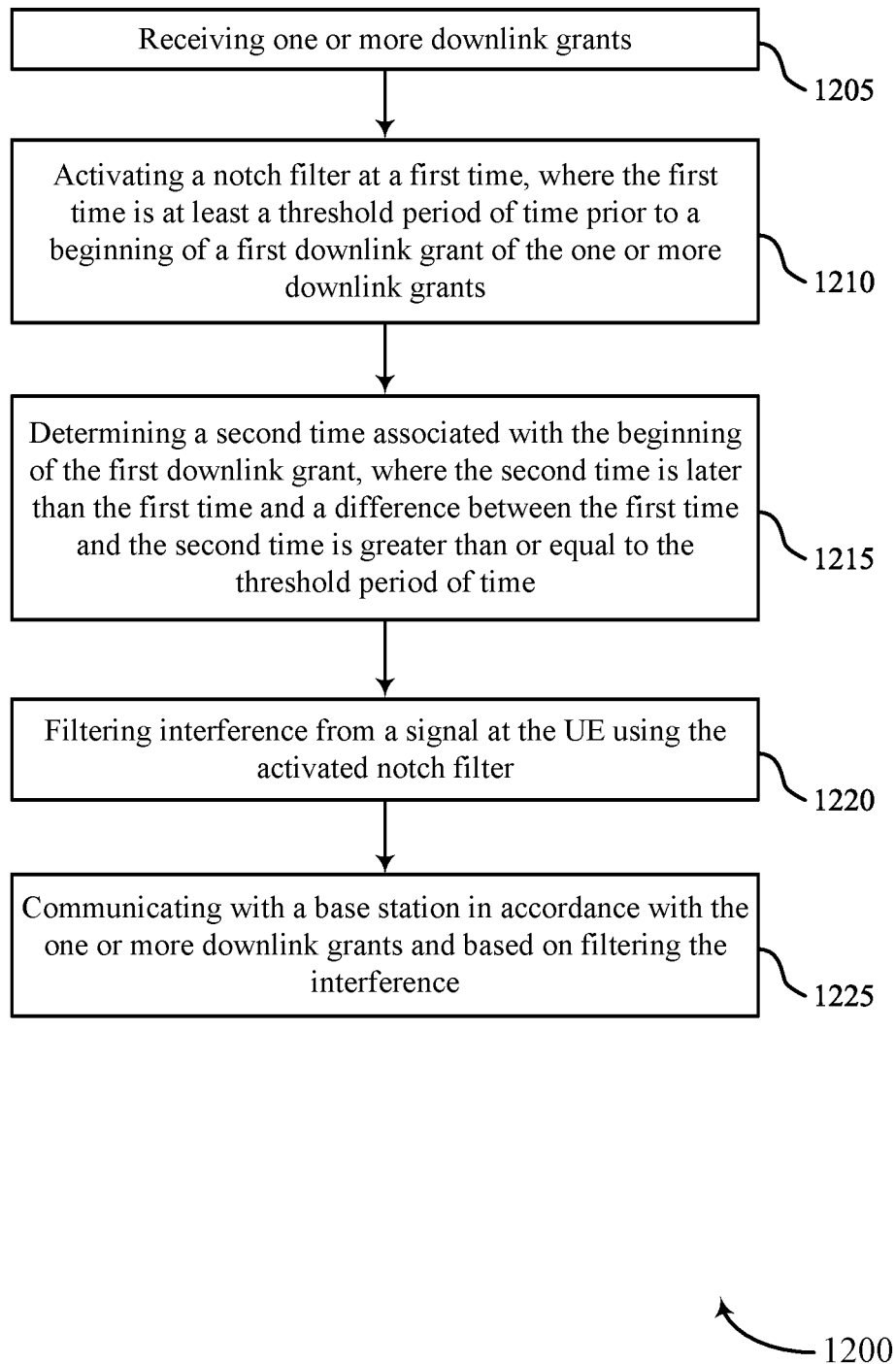
FIG. 12 shows a flowchart illustrating methods that support techniques for pre-opening notch filter in wireless communications system in accordance with various aspects of the present disclosure.

FIG. 12 shows a flowchart illustrating a method 1200 that supports techniques for pre-opening notch filter in wireless communications system in accordance with various aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving one or more downlink grants. The operations of 1205 may be performed in accordance with examples as disclosed herein. In some examples, aspects of the operations of 1205 may be performed by a downlink grant component 725 as described with reference to FIG. 7.

At 1210, the method may include activating a notch filter at a first time, where the first time is at least a threshold period of time prior to a beginning of a first downlink grant of the one or more downlink grants. The operations of 1210 may be performed in accordance with examples as disclosed herein. In some examples, aspects of the operations of 1210 may be performed by a notch filter component 730 as described with reference to FIG. 7.

At 1215, the method may include determining a second time associated with the beginning of the first downlink grant, where the second time is later than the first time and a difference between the first time and the second time is greater than or equal to the threshold period of time. The operations of 1215 may be performed in accordance with examples as disclosed herein. In some examples, aspects of the operations of 1215 may be performed by a downlink grant component 725 as described with reference to FIG. 7.

At 1220, the method may include filtering interference from a signal at the UE using the activated notch filter. The operations of 1220 may be performed in accordance with examples as disclosed herein. In some examples, aspects of the operations of 1220 may be performed by an interference component 735 as described with reference to FIG. 7.

At 1225, the method may include communicating with a base station in accordance with the one or more downlink grants and based on filtering the interference. The operations of 1225 may be performed in accordance with examples as disclosed herein. In some examples, aspects of the operations of 1225 may be performed by a communication component 740 as described with reference to FIG. 7.

The following provides an overview of aspects of the present disclosure:

Aspect 1: A method for wireless communication at a UE, comprising: receiving one or more downlink grants; activating a notch filter at a first time, wherein the first time is at least a threshold period of time prior to a beginning of a first downlink grant of the one or more downlink grants; filtering interference from a signal at the UE using the activated notch filter; and communicating with a base station in accordance with the one or more downlink grants and based at least in part on filtering the interference.

Aspect 2: The method of aspect 1, further comprising: waking up from a state of sleep at the first time, wherein activating the notch filter is based at least in part on waking up from the state of sleep.

Aspect 3: The method of aspect 2, further comprising: measuring the interference after waking up from the state of sleep and activating the notch filter; and identifying, based at least in part on measuring the interference, at least one of an amplitude of the interference, a frequency of the interference, or a phase of the interference, wherein filtering the interference at the UE is based at least in part on the amplitude of the interference, the frequency of the interference, or the phase of the interference.

Aspect 4: The method of aspect 3, further comprising: activating one or more analog phase locked loops based at least in part on waking up from the state of sleep; and identifying the phase associated with the interference based at least in part on activating the one or more analog phase locked loops, wherein the one or more analog phase locked loops of the UE remain deactivated while the UE is in the state of sleep.

Aspect 5: The method of any of aspects 1 through 4, further comprising: determining a second time associated with the beginning of the first downlink grant, wherein the second time is later than the first time and a difference between the first time and the second time is greater than or equal to the threshold period of time.

Aspect 6: The method of aspect 5, wherein filtering the interference further comprises: filtering the interference after the second time associated with the beginning of the first downlink grant of the one or more downlink grants.

Aspect 7: The method of any of aspects 5 through 6, further comprising: configuring the notch filter with a plurality of filtering coefficients at the first time, wherein filtering the interference further comprises filtering the interference using the configured notch filter.

Aspect 8: The method of aspect 7, further comprising: performing one or more measurements of the interference based at least in part on configuring the notch filter; and determining that the configured notch filter satisfies an accuracy threshold based at least in part on the one or more measurements.

Aspect 9: The method of aspect 8, wherein the notch filter satisfies the accuracy threshold prior to second time associated with the beginning of the first downlink grant of the one or more downlink grants.

Aspect 10: The method of any of aspects 1 through 9, further comprising: performing a set of channel measurements, wherein activating the notch filter comprises activating the notch filter at the first time based at least in part on determining that the set of channel measurements satisfies a threshold.

Aspect 11: The method of any of aspects 1 through 10, wherein a convergence of the notch filter to the interference occurs prior to the beginning of the one or more downlink grants.

Aspect 12: The method of any of aspects 1 through 11, wherein the interference includes a spur generated at the UE.

Aspect 13: The method of any of aspects 1 through 12, wherein activating the notch filter at the first time is based at least in part on a low noise amplifier state change, an analog front end state change, an analog digital converter state change, a phase locked loop reconfiguration, or a combination thereof.

Aspect 14: An apparatus for wireless communication at a UE, comprising a processor; memory coupled with the processor; and instructions stored in the memory and executable by the processor to cause the apparatus to perform a method of any of aspects 1 through 13.

Aspect 15: An apparatus for wireless communication at a UE, comprising at least one means for performing a method of any of aspects 1 through 13.

Aspect 16: A non-transitory computer-readable medium storing code for wireless communication at a UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving one or more downlink grants;
   activating a notch filter at a first time, wherein the first time is at least a threshold period of time prior to a beginning of a first downlink transmission associated with the one or more downlink grants;
   filtering interference from a signal at the UE using the activated notch filter; and
   communicating with a base station in accordance with the one or more downlink grants and based at least in part on filtering the interference.

2. The method of claim 1, further comprising:
   waking up from a state of sleep at the first time, wherein activating the notch filter is based at least in part on waking up from the state of sleep.

3. The method of claim 2, further comprising:
   measuring the interference after waking up from the state of sleep and activating the notch filter; and
   identifying, based at least in part on measuring the interference, at least one of an amplitude of the interference, a frequency of the interference, or a phase of the interference, wherein filtering the interference at the UE is based at least in part on the amplitude of the interference, the frequency of the interference, or the phase of the interference.

4. The method of claim 3, further comprising:
   activating one or more analog phase locked loops based at least in part on waking up from the state of sleep; and
   identifying the phase associated with the interference based at least in part on activating the one or more analog phase locked loops, wherein the one or more analog phase locked loops of the UE remain deactivated while the UE is in the state of sleep.

5. The method of claim 1, further comprising:
   determining a second time associated with the beginning of the first downlink transmission, wherein the second time is later than the first time and a difference between the first time and the second time is greater than or equal to the threshold period of time.

6. The method of claim 5, wherein filtering the interference further comprises:
   filtering the interference after the second time associated with the beginning of the first downlink transmission associated with the one or more downlink grants.

7. The method of claim 5, further comprising:
   configuring the notch filter with a plurality of filtering coefficients at the first time, wherein filtering the interference further comprises filtering the interference using the configured notch filter.

8. The method of claim 7, further comprising:
   performing one or more measurements of the interference based at least in part on configuring the notch filter; and
   determining that the configured notch filter satisfies an accuracy threshold based at least in part on the one or more measurements.

9. The method of claim 8, wherein the notch filter satisfies the accuracy threshold prior to the second time associated with the beginning of the first downlink transmission associated with the one or more downlink grants.

10. The method of claim 1, further comprising:
    performing a set of channel measurements, wherein activating the notch filter comprises activating the notch filter at the first time based at least in part on determining that the set of channel measurements satisfies a threshold.

11. The method of claim 1, wherein a convergence of the notch filter to the interference occurs prior to the beginning of the one or more downlink grants.

12. The method of claim 1, wherein the interference includes a spur generated at the UE.

13. The method of claim 1, wherein activating the notch filter at the first time is based at least in part on a low noise amplifier state change, an analog front end state change, an analog digital converter state change, a phase locked loop reconfiguration, or a combination thereof.

14. An apparatus for wireless communication at a user equipment (UE), comprising:
a processor;
memory coupled with the processor; and
instructions stored in the memory and executable by the processor to cause the apparatus to:
receive one or more downlink grants;
activate a notch filter at a first time, wherein the first time is at least a threshold period of time prior to a beginning of a first downlink transmission associated with the one or more downlink grants;
filter interference from a signal at the UE using the activated notch filter; and
communicate with a base station in accordance with the one or more downlink grants and based at least in part on filtering the interference.

15. The apparatus of claim 14, wherein the instructions are further executable by the processor to cause the apparatus to:
wake up from a state of sleep at the first time, wherein activating the notch filter is based at least in part on waking up from the state of sleep.

16. The apparatus of claim 15, wherein the instructions are further executable by the processor to cause the apparatus to:
measure the interference after waking up from the state of sleep and activating the notch filter; and
identify, based at least in part on measuring the interference, at least one of an amplitude of the interference, a frequency of the interference, or a phase of the interference, wherein filtering the interference at the UE is based at least in part on the amplitude of the interference, the frequency of the interference or the phase of the interference.

17. The apparatus of claim 16, wherein the instructions are further executable by the processor to cause the apparatus to:
activate one or more analog phase locked loops based at least in part on waking up from the state of sleep; and
identify the phase associated with the interference based at least in part on activating the one or more analog phase locked loops, wherein the one or more analog phase locked loops of the UE remain deactivated while the UE is in the state of sleep.

18. The apparatus of claim 14, wherein the instructions are further executable by the processor to cause the apparatus to:
determine a second time associated with the beginning of the first downlink transmission, wherein the second time is later than the first time and a difference between the first time and the second time is greater than or equal to the threshold period of time.

19. The apparatus of claim 18, wherein the instructions to filter the interference are further executable by the processor to cause the apparatus to:
filter the interference after the second time associated with the beginning of the first downlink transmission associated with the one or more downlink grants.

20. The apparatus of claim 18, wherein the instructions are further executable by the processor to cause the apparatus to:
configure the notch filter with a plurality of filtering coefficients at the first time, wherein filtering the interference further comprises filtering the interference using the configured notch filter.

21. The apparatus of claim 20, wherein the instructions are further executable by the processor to cause the apparatus to:
perform one or more measurements of the interference based at least in part on configuring the notch filter; and
determine that the configured notch filter satisfies an accuracy threshold based at least in part on the one or more measurements.

22. The apparatus of claim 21, wherein the notch filter satisfies the accuracy threshold prior to the second time associated with the beginning of the first downlink transmission associated with the one or more downlink grants.

23. The apparatus of claim 14, wherein the instructions are further executable by the processor to cause the apparatus to:
perform a set of channel measurements, wherein activating the notch filter comprises activating the notch filter at the first time based at least in part on determining that the set of channel measurements satisfies a threshold.

24. The apparatus of claim 14, wherein a convergence of the notch filter to the interference occurs prior to the beginning of the one or more downlink grants.

25. The apparatus of claim 14, wherein the interference includes a spur generated at the UE.

26. The apparatus of claim 14, wherein activating the notch filter at the first time is based at least in part on a low noise amplifier state change, an analog front end state change, an analog digital converter state change, a phase locked loop reconfiguration, or a combination thereof.

27. An apparatus for wireless communication at a user equipment (UE), comprising:
means for receiving one or more downlink grants;
means for activating a notch filter at a first time, wherein the first time is at least a threshold period of time prior to a beginning of a first downlink transmission associated with the one or more downlink grants;
means for filtering interference from a signal at the UE using the activated notch filter; and
means for communicating with a base station in accordance with the one or more downlink grants and based at least in part on filtering the interference.

28. The apparatus of claim 27, further comprising:
means for waking up from a state of sleep at the first time, wherein activating the notch filter is based at least in part on waking up from the state of sleep.

29. A non-transitory computer-readable medium storing code for wireless communication at a user equipment (UE), the code comprising instructions executable by a processor to:
receive one or more downlink grants;
activate a notch filter at a first time, wherein the first time is at least a threshold period of time prior to a beginning of a first downlink transmission associated with the one or more downlink grants;
filter interference from a signal at the UE using the activated notch filter; and
communicate with a base station in accordance with the one or more downlink grants and based at least in part on filtering the interference.

30. The non-transitory computer-readable medium of claim 29, wherein the instructions are further executable by the processor to:
    wake up from a state of sleep at the first time, wherein activating the notch filter is based at least in part on waking up from the state of sleep.

* * * * *